(12) United States Patent
Abhari et al.

(10) Patent No.: US 12,497,567 B2
(45) Date of Patent: Dec. 16, 2025

(54) DECARBOXYLATIVE CO-DIMERIZATION PROCESS AND SYNTHETIC FUELS PRODUCED THEREFROM

(71) Applicant: REG SYNTHETIC FUELS, LLC, Ames, IA (US)

(72) Inventors: Ramin Abhari, Bixby, OK (US); Nate Green, Ames, IA (US)

(73) Assignee: REG Synthetic Fuels, LLC, Ames, IA (US)

( * ) Notice: Subject to any disclaimer, the term of this patent is extended or adjusted under 35 U.S.C. 154(b) by 92 days.

(21) Appl. No.: 17/384,562

(22) Filed: Jul. 23, 2021

(65) Prior Publication Data

US 2022/0025273 A1 Jan. 27, 2022

Related U.S. Application Data

(60) Provisional application No. 63/056,327, filed on Jul. 24, 2020.

(51) Int. Cl.
*C10G 3/00* (2006.01)
*C10L 1/06* (2006.01)
(Continued)

(52) U.S. Cl.
CPC ............... *C10G 3/52* (2013.01); *C10L 1/06* (2013.01); *C10L 1/08* (2013.01); *C25B 3/03* (2021.01);
(Continued)

(58) Field of Classification Search
CPC .... C10G 2300/1007; C10G 2300/1014; C10G 2300/1018; C10G 2300/304;
(Continued)

(56) References Cited

U.S. PATENT DOCUMENTS

2010/0159553 A1    6/2010  Bradin
2011/0035995 A1*   2/2011  Busch .................. C10L 1/02
                                                568/687

(Continued)

FOREIGN PATENT DOCUMENTS

EP    2 905 359 A1    8/2015
JP    2010-529274 A   8/2010
(Continued)

OTHER PUBLICATIONS

International Search Report and Written Opinion on International Application No. PCT/US2021/043052 dated Oct. 13, 2021 (12 pgs).
(Continued)

*Primary Examiner* — Latosha Hines
(74) *Attorney, Agent, or Firm* — Foley & Lardner LLP

(57) ABSTRACT

In an aspect, the application discloses a method for producing renewable hydrocarbon fuels where the method includes electrolysis of a mixture to produce an electrolysis product comprising a renewable diesel and optionally a renewable gasoline, where the mixture includes (i) free fatty acids from a biorenewable feedstock, and (ii) terminal monomethyl-branched carboxylic acids, and where the renewable diesel includes terminal monomethyl-branched paraffins and terminal monomethyl-branched alkenes.

20 Claims, 1 Drawing Sheet

(51) Int. Cl.
*C10L 1/08* (2006.01)
*C25B 3/03* (2021.01)

(52) U.S. Cl.
CPC ........... *C10G 2300/1007* (2013.01); *C10G 2300/1014* (2013.01); *C10G 2300/1018* (2013.01); *C10G 2300/304* (2013.01); *C10G 2300/305* (2013.01); *C10G 2300/307* (2013.01); *C10G 2400/02* (2013.01); *C10G 2400/04* (2013.01); *C10L 2200/0476* (2013.01); *C10L 2200/0484* (2013.01); *C10L 2270/023* (2013.01); *C10L 2270/026* (2013.01); *C10L 2290/38* (2013.01)

(58) Field of Classification Search
CPC ........ C10G 2300/305; C10G 2300/307; C10G 2400/02; C10G 2400/04; C10G 3/00; C10G 3/52; C10G 45/02; C10L 1/06; C10L 1/08; C10L 2200/0476; C10L 2200/0484; C10L 2270/023; C10L 2270/026; C10L 2290/38; C25B 3/03
See application file for complete search history.

(56) References Cited

U.S. PATENT DOCUMENTS

| | | | | |
|---|---|---|---|---|
| 2011/0111475 | A1* | 5/2011 | Kuhry | C12P 7/6409 435/166 |
| 2012/0100591 | A1* | 4/2012 | Kohn | C12P 5/02 435/252.8 |
| 2014/0038254 | A1* | 2/2014 | Kuhry | C12P 7/54 435/167 |
| 2014/0323784 | A1* | 10/2014 | Joshi | C10G 3/48 585/326 |
| 2020/0048569 | A1 | 2/2020 | Karvo et al. | |

FOREIGN PATENT DOCUMENTS

| | | | |
|---|---|---|---|
| JP | 2014-074207 A | 4/2014 | |
| WO | WO-2007027669 A1 * | 3/2007 | ............... C10L 1/08 |
| WO | WO-2007068798 A2 * | 6/2007 | ........... C07C 1/2078 |
| WO | WO-2008/152199 A1 | 12/2008 | |
| WO | WO-2019/084518 A1 | 5/2019 | |
| WO | WO-2020/093127 A1 | 5/2020 | |

OTHER PUBLICATIONS

Lu, D., "Can we quit cobalt batteries fast enough to make electric cars viable?" New Scientist, No. 3271 (2020), https://www.newscientist.com/article/2234567-can-we-quit-cobalt-batteries-fast-enough-to-make-electric-cars-viable/ (3 pages).

Yanowitz, J., et al., "Compendium of Experimental Cetane Numbers," Nat'l. Renewable Energy Lab., Technical Report NREL/TP-5400-67585, Feb. 2017 (78 pages).

Search Report and Written Opinion on SG 11202261693Y Dtd Dec. 27, 2024, 10 pages.

Office Action on CN 202180059286.9 Dtd Jan. 28, 2025, 15 pages including English translation.

Notice of Reasons for Rejection on JP 2023-504210 DTD Oct. 2, 2025, 10 pages including English translation.

* cited by examiner

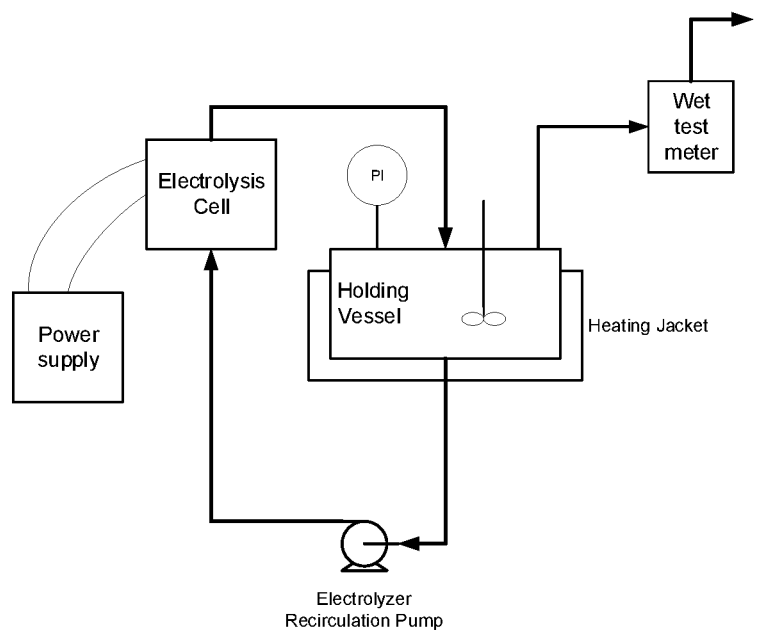

DECARBOXYLATIVE CO-DIMERIZATION PROCESS AND SYNTHETIC FUELS PRODUCED THEREFROM

CROSS-REFERENCE TO RELATED APPLICATIONS

This application claims the benefit of and priority to U.S. Provisional Appl. No. 63/056,327, filed Jul. 24, 2020, the entirety of which is herein incorporated by reference for any and all purposes.

FIELD

The present technology relates to synthetic fuels and biofuels, and more particularly, to biomass-based diesel fuels and gasoline. Specifically, the present invention relates to production of renewable hydrocarbon diesel via decarboxylative co-dimerization of free fatty acids and short chain carboxylic acids.

SUMMARY

In an aspect, a method for producing renewable hydrocarbon fuels is provided where the method includes electrolysis of a mixture to produce an electrolysis product comprising a renewable diesel and optionally a renewable gasoline, where the mixture includes (i) free fatty acids from a biorenewable feedstock, and (ii) terminal monomethyl-branched carboxylic acids, and where the renewable diesel includes terminal monomethyl-branched paraffins and terminal monomethyl-branched alkenes.

BRIEF DESCRIPTION OF THE DRAWING

FIG. 1 provides a representative diagram of an electrolysis reactor system of the exemplary method of the present technology disclosed herein.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 weight %" would be understood to mean "9 weight % to 11 weight %." It is to be understood that when "about" precedes a term, the term is to be construed as disclosing "about" the term as well as the term without modification by "about"—for example, "about 10 wt %" discloses "9 wt % to 11 wt %" as well as disclosing "10 wt %."

The phrase "and/or" as used in the present disclosure will be understood to mean any one of the recited members individually or a combination of any two or more thereof—for example, "A, B, and/or C" would mean "A, B, C, A and B, A and C, or B and C."

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "alkyl" groups include straight chain and branched alkyl groups, such as those having from 1 to 25 carbon atoms. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. It will be understood that the phrase "$C_x$-$C_y$ alkyl," such as $C_1$-$C_4$ alkyl, means an alkyl group with a carbon number falling in the range from x to y.

Cycloalkyl groups include mono-, bi-, or tricyclic alkyl groups having from 3 to 12 carbon atoms in the ring(s). Cycloalkyl groups may be substituted with one or more alkyl groups or may be unsubstituted. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Bi- and tricyclic ring systems include both bridged cycloalkyl groups and fused rings, such as, but not limited to, bicyclo[2.1.1]hexane, adamantyl, decalinyl, and the like. Representative substituted cycloalkyl groups may be mono-substituted or substituted more than once, such as, but not limited to, 2,2-, 2,3-, 2,4- 2,5- or 2,6-disubstituted cyclohexyl groups.

Alkenyl groups include straight chain and branched chain alkyl groups as defined above, except that at least one double bond exists between two carbon atoms. Alkenyl groups have from 2 to 25 carbon atoms. An alkenyl group of any embodiment herein may have one, two, three, or four carbon-carbon double bonds. Examples of alkenyl groups include, but are not limited, to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, among others.

Cycloalkenyl groups include cycloalkyl groups as defined above, having at least one double bond between two carbon atoms. Cycloalkenyl groups may be substituted with one or more alkyl groups or may be unsubstituted. The cycloalkenyl group may have one, two, or three double bonds, but does not include aromatic compounds. Cycloalkenyl groups may have from 4 to 14 carbon atoms, 5 to 14 carbon atoms, 5 to 10 carbon atoms, or even 5, 6, 7, or 8 carbon atoms. Examples of cycloalkenyl groups include cyclohexenyl, cyclopentenyl, cyclohexadienyl, cyclobutadienyl, and cyclopentadienyl.

The term "aromatics" as used herein is synonymous with "aromates" and means both cyclic aromatic hydrocarbons that do not contain heteroatoms as well as heterocyclic aromatic compounds. The term includes monocyclic, bicyclic and polycyclic ring systems (collectively, such bicyclic and polycyclic ring systems are referred to herein as "polycyclic aromatics" or "polycyclic aromates"). The term also includes aromatic species with alkyl groups and cycloalkyl groups. Thus, aromatics include, but are not limited to, benzene, azulene, heptalene, phenylbenzene, indacene, fluorene, phenanthrene, triphenylene, pyrene, naphthacene, chrysene, anthracene, indene, indane, pentalene, and naphthalene, as well as alkyl and cycloalkyl substituted variants of these compounds. In some embodiments, aromatic species contains 6-14 carbons, and in others from 6 to 12 or even 6-10 carbon atoms in the ring portions of the groups. The phrase includes groups containing fused rings, such as fused aromatic-aliphatic ring systems (e.g., indane, tetrahydronaphthene, and the like).

"Oxygenates" as used herein means carbon-containing compounds containing at least one covalent bond to oxygen. Examples of functional groups encompassed by the term include, but are not limited to, carboxylic acids, carboxylates, acid anhydrides, aldehydes, esters, ethers, ketones, and alcohols, as well as heteroatom esters and anhydrides such as phosphate esters and phosphate anhydrides. Oxygenates may also be oxygen containing variants of aromatics, cycloparaffins, and paraffins as described herein.

The term "paraffins" as used herein means non-cyclic, branched or unbranched alkanes. An unbranched paraffin is an n-paraffin; a branched paraffin is an iso-paraffin (also referred to as an "isoparaffin"). "Cycloparaffins" are cyclic, branched or unbranched alkanes.

The term "paraffinic" as used herein means both paraffins and cycloparaffins as defined above as well as predominantly hydrocarbon chains possessing regions that are alkane, either branched or unbranched, with mono- or di-unsaturation (i.e., one or two double bonds).

Hydroprocessing as used herein describes the various types of catalytic reactions that occur in the presence of hydrogen without limitation. Examples of the most common hydroprocessing reactions include, but are not limited to, hydrogenation, hydrodesulfurization (HDS), hydrodenitrogenation (HDN), hydrotreating (HT), hydrocracking (HC), aromatic saturation or hydrodearomatization (HDA), hydrodeoxygenation (HDO), decarboxylation (DCO), hydroisomerization (HI), hydrodewaxing (HDW), hydrodemetallization (HDM), decarbonylation, methanation, and reforming. Depending upon the type of catalyst, reactor configuration, reactor conditions, and feedstock composition, multiple reactions can take place that range from purely thermal (i.e., do not require catalyst) to catalytic. In the case of describing the main function of a particular hydroprocessing unit, for example an HDO reaction system, it is understood that the HDO reaction is merely one of the predominant reactions that are taking place and that other reactions may also take place.

Pyrolysis is understood to mean thermochemical decomposition of carbonaceous material with little to no diatomic oxygen or diatomic hydrogen present during the thermochemical reaction. The optional use of a catalyst in pyrolysis is typically referred to as catalytic cracking, which is encompassed by the term as pyrolysis, and is not be confused with hydrocracking.

Hydrotreating (HT) involves the removal of elements from groups 3, 5, 6, and/or 7 of the Periodic Table from organic compounds. Hydrotreating may also include hydrodemetallization (HDM) reactions. Hydrotreating thus involves removal of heteroatoms such as oxygen, nitrogen, sulfur, and combinations of any two more thereof through hydroprocessing. For example, hydrodeoxygenation (HDO) is understood to mean removal of oxygen by a catalytic hydroprocessing reaction to produce water as a by-product; similarly, hydrodesulfurization (HDS) and hydrodenitrogenation (HDN) describe the respective removal of the indicated elements through hydroprocessing.

Hydrogenation involves the addition of hydrogen to an organic molecule without breaking the molecule into subunits. Addition of hydrogen to a carbon-carbon or carbon-oxygen double bond to produce single bonds are two non-limiting examples of hydrogenation. Partial hydrogenation and selective hydrogenation are terms used to refer to hydrogenation reactions that result in partial saturation of an unsaturated feedstock. For example, vegetable oils with a high percentage of polyunsaturated fatty acids (e.g., linoleic acid) may undergo partial hydrogenation to provide a hydroprocessed product wherein the polyunsaturated fatty acids are converted to mono-unsaturated fatty acids (e.g., oleic acid) without increasing the percentage of undesired saturated fatty acids (e.g., stearic acid). While hydrogenation is distinct from hydrotreatment, hydroisomerization, and hydrocracking, hydrogenation may occur amidst these other reactions.

Hydrocracking (HC) is understood to mean the breaking of a molecule's carbon-carbon bond to form at least two molecules in the presence of hydrogen. Such reactions typically undergo subsequent hydrogenation of the resulting double bond.

Hydroisomerization (HI) is defined as the skeletal rearrangement of carbon-carbon bonds in the presence of hydrogen to form an isomer. Hydrocracking is a competing reaction for most HI catalytic reactions and it is understood that the HC reaction pathway, as a minor reaction, is included in the use of the term HI. Hydrodewaxing (HDW) is a specific form of hydrocracking and hydroisomerization designed to improve the low temperature characteristics of a hydrocarbon fluid.

It will be understood that if a composition is stated to include "$C_x$-$C_y$ hydrocarbons," such as $C_7$-$C_{12}$ n-paraffins, this means the composition includes one or more paraffins with a carbon number falling in the range from x to y.

The phrase "at least a portion of" in regard to a composition means from about 1% to about 100% of the composition.

A "diesel fuel" in general refers to a fuel with a boiling point that falls in the range from about 150° C. to about 360° C. (the "diesel boiling range").

A "gasoline" in general refers to a fuel for spark-ignition engines with a boiling point that falls in the range from about 30° C. to about 200° C.

A "biodiesel" as used herein refers to fatty acid $C_1$-$C_4$ alkyl esters produced by esterification and/or transesterification reactions between a $C_1$-$C_4$ alkyl alcohol and free fatty acids and/or fatty acid glycerides, such as described in U.S. Pat. Publ. No. 2016/0145536, incorporated herein by reference.

A "petroleum diesel" as used herein refers to diesel fuel produced from crude oil, such as in a crude oil refining facility and includes hydrotreated straight-run diesel, hydrotreated fluidized catalytic cracker light cycle oil, hydrotreated coker light gasoil, hydrocracked FCC heavy cycle oil, and combinations thereof. Similarly, a "petroleum-derived" compound or composition refers to a compound or composition produced directly from crude oil or produced from components and/or feedstocks that ultimately were produced from crude oil and not biorenewable feedstocks (where biorenewable feedstocks are described more fully infra).

It is to be understood that a "volume percent" or "vol. %" of a component in a composition or a volume ratio of different components in a composition is determined at 60° F. based on the initial volume of each individual component, not the final volume of combined components.

Throughout this disclosure, various publications, patents and published patent specifications are referenced by an identifying citation. Also within this disclosure are Arabic numerals referring to referenced citations, the full bibliographic details of which are provided preceding the claims. The disclosures of these publications, patents and published patent specifications are hereby incorporated by reference into the present disclosure.

The Present Technology

Renewable diesel (RD) is an isoparaffinic compression ignition fuel that includes fuels produced by hydroprocessing of fats and oils. The hydroprocessing of fats and oils generally includes hydrodeoxygenation (HDO) of fatty acids/glycerides to hydrocarbons rich in n-paraffins, followed by hydroisomerization (HI) of the n-paraffins to isoparaffins. Commercial production of RD began in 2007 and has grown to over 1.5 billion gal/y worldwide in the years since.

Because significant hydrogen is consumed in the process, current RD facilities typically require co-location with hydrogen plants or hydrogen supply pipelines. As a result, RD plants are often built far from major sources of feedstock complicating supply logistics and challenging the vision of locally sourced biofuel production.

The share of renewable power (e.g., wind and solar) in electricity grids has been increasing over the past decade. This has created the opportunity to reduce greenhouse gas emissions by transitioning to electric vehicles (EVs). However the lithium-ion battery technology for EVs relies on cobalt, a metal that is not available at volumes necessary to support EV growth. According to *New Scientist* magazine (February 2020), the projected EV demand in 2030 will require 1.6 times the world's total cobalt refining capacity. Furthermore, the waste associated with reclamation of metals from spent batteries is likely to make battery-powered EVs unsustainable.

Hydrogen-powered EVs are being considered as a more sustainable alternative. Here, hydrogen produced from water electrolysis powers the vehicle through an onboard fuel cell. However, fueling up a car with hydrogen, where it is stored at pressures exceeding 10,000 psig, raises safety and security concerns. Hydrogen has among the lowest known ignition energies and broadest flammability range in air, thus providing heightened fire/explosion risks. This has raised doubts among experts regarding the viability of hydrogen-powered cars.

Electrolytic dimerization of carboxylic acids, also known as Kolbe electrolysis, has been taught in the prior art. During Kolbe electrolysis, two moles of carboxylic acid R—COOH decarboxylate and dimerize in one step to form one mole of a hydrocarbon R—R (where R is an alkyl group.) The byproduct of the reaction is carbon dioxide. U.S. Pat. No. 8,961,775 discloses the use of Kolbe electrolysis for production of hydrocarbons from free fatty acids (FFA), however the electrolytic conversion disclosed in this patent produces hydrocarbons that are outside of gasoline and diesel boiling range and are instead disclosed to be suitable for heavy fuel oil or lubricant base oils.

Applicant's present technology addresses two unmet needs of the energy industry, namely (1) how to produce RD without hydrogen and (2) how to sustainably deploy renewable power for transportation. As discussed regarding the present technology, these needs are met by the present technology of this disclosure via using electric power—instead of hydrogen—to produce renewable diesel.

In addition, there is a need for diesel fuel compositions that have high concentration of terminally methyl-branched isoparaffins/terminally methyl-branched alkenes and with virtually no straight-chain n-paraffins. Such diesel fuel compositions are expected to have a better balance of low cloud point (good low-temperature flow) and high cetane number (short ignition delay) than the compositions disclosed in the prior art. For example, in the renewable diesel prior art, diesel-range n-paraffins are hydroisomerized over bifunctional catalysts to form compositions that have between 5 wt % and 30 wt % n-paraffins in the diesel product. Attempts at converting more of the n-paraffins using the prior art RD technology results in the formation of di/tri-methyl branching and cracking, thus reducing the diesel yield.

Prior art references describe isoparaffinic middle distillate compositions produced by oligomerization of $C_3$-$C_4$ alkenes such as propylene and butenes to produce highly branched alkenes that are subsequently hydrogenated into highly branched isoparaffins. These technologies produce highly branched isoparffin compositions (e.g., 2,2-dimethyl-4-ethyloctane). As diesel fuels, these hydrocarbons have superior low temperature properties; however, they have low cetane numbers and therefore not appropriate for modern high performance diesel engines. There is thus a need for diesel fuel composition that includes terminal monomethyl-branched hydrocarbons while concurrently containing virtually no n-paraffins. Applicant's present technology also addresses this need.

Thus, in an aspect, the present technology provides a method for producing renewable hydrocarbon fuels, where method includes electrolysis (e.g., Kolbe electrolysis) of a mixture—where the mixture includes (i) free fatty acids from a biorenewable feedstock, and (ii) terminal monomethyl-branched carboxylic acids—to produce an electrolysis product. The electrolysis product includes a renewable diesel and optionally a renewable gasoline, where the renewable diesel includes terminal monomethyl-branched paraffins and terminal monomethyl-branched alkenes. In any embodiment disclosed herein, the terminal monomethyl-branched carboxylic acids may include petroleum-derived terminal monomethyl-branched carboxylic acids, terminal monomethyl-branched carboxylic acids from a biorenewable feedstock, or both. In any embodiment disclosed herein, the terminal monomethyl-branched carboxylic acids may include isobutyric acid and/or isovaleric acid. In any embodiment herein, it may be that the only terminal monomethyl-branched carboxylic acids in the mixture are isobutyric acid, isovaleric acid, or both isobutyric acid and isovaleric acid. In any embodiment disclosed herein, the mixture may be included in an electrolysis cell (also referred to as an electrolyzer) that includes an anode and a cathode.

The method of the present technology may be described as including "Decarboxylative Co-Dimerization" (DCD), but such a description is merely to aid in a person of ordinary skill in the art's understanding of the present disclosure and the present technology is not limited by such a descriptor. Two illustrative examples are provided in Eq. 1a and Eq. 1b, where isobutyric acid (also referred to as 2-methylpropionic acid; Eq. 1a) or isovaleric acid (3-methylbutanoic acid; Eq. 1b) and a free fatty acid ("$R^1$—C(O)OH" in Eq. 1a and "$R^2$—C(O)OH" in Eq. 1b) undergo DCD to produce a terminal monomethyl-branched hydrocarbon as the electrolysis product as well as produce $CO_2$ and $H_2$.

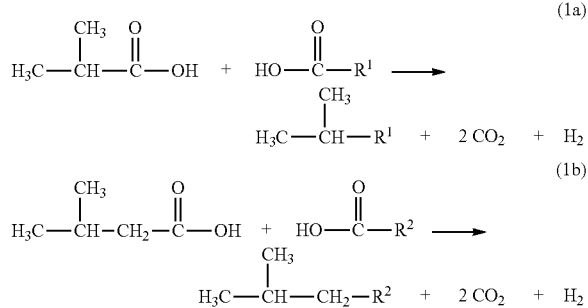

In Eq. 1a and Eq. 1b, $R^1$ and $R^2$ are each independently an unbranched alkyl group or an unbranched alkenyl group. For example, $R^1$ and $R^2$ may each independently be an unbranched $C_7$-$C_{23}$ alkyl group, an unbranched $C_{15}$-$C_{23}$ mono-unsaturated alkenyl group, or an unbranched $C_{15}$-$C_{23}$ poly-unsaturated alkenyl group. Thus, the electrolysis products,

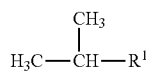

in Eq. 1a and

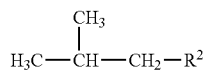

in Eq. 1b, are terminal monomethyl-branched hydrocarbons—that is, a single methyl group branches off of the otherwise straight-chain hydrocarbon at only one place at the most terminal possible position on the hydrocarbon as indicated in Eq. 1a and Eq. 1b (the "2" position in isoparaffins per IUPAC nomenclature). The advantageous features of the electrolysis product provided by the present technology are discussed in more detail later in this disclosure. Further advantageous is the production of $H_2$ during the electrolysis. The $CO_2$ produced during the electrolysis may also be recovered and utilized as a valuable co-product.

In any embodiment disclosed herein, it may be that—in order to minimize or eliminate formation of heavy hydrocarbons produced from homo-dimerization of free fatty acids during the electrolysis—a molar excess of the terminal monomethyl-branched carboxylic acids (excess relative to the free fatty acids) is included in the mixture. For example, in any embodiment disclosed herein including a molar excess of isobutyric acid as the terminal monomethyl-branched carboxylic acid, co-production of decarboxylative dimers of the free fatty acids (e.g., as heavy oil and/or wax) may be minimized or completely eliminated in comparison to utilizing an equimolar amount of isobutyric acid. Concurrently, there is a relative increase in the decarboxylative dimers of isobutyric acid, i.e., 2,3-dimethylbutane [$(CH_3)_2$CH—CH$(CH_3)_2$]. Notably, 2,3-dimethylbutane is an alkylate-type gasoline component with Motor Octane Number (MON) of 94.4. Further, where the isobutyric acid of the method is produced from bio-isobutanol, the 2,3-dimethylbutane alkylate-type gasoline is a renewable gasoline (or renewable gasoline component) for spark-ignition engines. Thus, as noted earlier in this disclosure, the method of the present technology also may produce renewable gasoline, i.e., dimers of the terminal monomethyl-branched carboxylic acids produced in the electrolysis. This high-octane renewable alkylate-type gasoline may be combined with the relatively low octane value renewable naphtha of prior art (e.g., as disclosed in U.S. Pat. No. 8,581,013) to provide a 100% renewable hydrocarbon gasoline with an octane rating of 87 or higher (octane rating=(MON+RON)/2, where RON is the Research Octane Number) and thus suitable for use in current automobiles with spark-ignition engines. In any embodiment disclosed herein of the process of the present technology, it may be the mixture includes at least a 100% molar excess of terminal monomethyl-branched carboxylic acids (i.e., at least double the stoichiometric amount of free fatty acids), at least a 200% molar excess of terminal monomethyl-branched carboxylic acids, or at least a 300% molar excess terminal monomethyl-branched carboxylic acids.

The electrolysis cell may be any vessel equipped with electrodes leading to a direct current (D.C.) power supply. The vessel may be further equipped with provisions for temperature control (e.g., via heat transfer circulation through a jacket) and agitation. The vessel may also be in controlled fluid communication with conduit for communicating away the $CO_2$ gas and $H_2$ gas produced during electrolysis (e.g., as a "tail gas"). Separation methods, apparatus, and techniques for separating, purifying, and sequestering each of $CO_2$ and $H_2$ are well known to a person of ordinary skill in the art. For example, the $CO_2$ tail gas from the electrolyzer may be sequestered by contacting with a metal carbonate and/or an amine solution, as well known to a person of ordinary skill in the art. As noted previously, the biogenic $CO_2$ that is recovered may be utilized as a valuable co-product (e.g., for beverage carbonation) or as a feed for other process (e.g., for use in syngas-producing processes).

In any embodiment disclosed herein, it may be that the mixture includes a $C_1$-$C_3$ alcohol (e.g., methanol, ethanol, isopropanol, or a combination of any two or more thereof), where such a $C_1$-$C_3$ alcohol may beneficially act as a solvent. In any embodiment disclosed herein, prior to electrolysis the method may include adding a caustic (such as a hydroxide salt, e.g., NaOH and/or KOH) to the mixture. Such adding may partially neutralize the acidity of the mixture, and in any embodiment herein including adding caustic it may be that the caustic is added in an amount in terms of [moles of hydroxide anion]/[total moles of free fatty acids and terminal monomethyl-branched carboxylic acids]×100% of about 10% to about 80%, preferably about 30% to about 60%.

Anodes and cathodes suitable for use in the electrolysis of the method are well understood by a person of ordinary skill in the art. In any embodiment herein, it may be the method includes a platinum anode. In any embodiment herein, it may be the method includes a cathode that includes graphite, nickel, stainless steel, or a combination of any two or more thereof. Various electrode configurations, e.g., plates or foils, are known to a person of ordinary skill in the art where such a person of ordinary skill in the art would readily apprehend suitable electrode configurations for the electrolysis of the present technology.

The electrolysis of any embodiment disclosed herein may include an electrode current density (measure of electric current across electrode surface area) from about 0.05 amperes/cm$^2$ (A/cm$^2$) to about 1.0 A/cm$^2$, preferably from about 0.1 A/cm$^2$ to about 0.3 A/cm$^2$. The electrolysis of any embodiment disclosed herein may include a cell voltage from about 8 Volts to about 35 Volts, preferably about 10 Volts to about 30 Volts. In any embodiment disclosed herein, the mixture during electrolysis may be at a temperature from about 25° C. to about 200° C. In any embodiment disclosed herein, the electrolysis may be conducted at a pressure from about 1 atmosphere to about the vapor pressure of the mixture. The electrolysis of any embodiment disclosed herein may include a cycle time from about 30 minutes to about 240 minutes. The electrolysis may be conducted in batch or continuous mode.

In any embodiment disclosed herein, the electrolysis of the present technology may be powered by renewable electricity, e.g., electricity from wind turbines and/or concentrated solar, and thus the renewable diesel produced by use of such power has a lower carbon intensity than RD produced by hydroprocessing methods. In any embodiment disclosed herein, the renewable diesel may have a carbon intensity as measured by CARB methodology of less than about 30 gCO2$_e$/MJ, preferably less than about 25 gCO2$_e$/MJ. It is further notable the method of the present technology, irrespective of whether renewable electricity is used, does not produce hydrocracking byproducts such as LPG.

In any embodiment disclosed herein where the mixture includes a $C_1$-$C_3$ alcohol, an electrolysis effluent may include the electrolysis product and the $C_1$-$C_3$ alcohol. The electrolysis effluent may include no remaining amount of the mixture or may include up to about 30 wt % of the mixture (i.e., that did not convert to electrolysis product during the electrolysis). The electrolysis effluent may be subjected to one or more processing steps to separate the electrolysis product from the remaining components of the electrolysis effluent. A person of ordinary skill in the art would readily appreciate the various methods, techniques, and apparatus known to a person of ordinary skill in the art that are suitable for the separation of the electrolysis product from the rest of the remaining components of the electrolysis effluent. Such methods and techniques include distillation and solvent extraction. In any embodiment disclosed herein, at least a portion of the $C_1$-$C_3$ alcohol may be recovered from the electrolysis effluent, and may optionally be recycled in the method of the present technology.

The biorenewable feedstock of any embodiment disclosed herein includes free fatty acids, fatty acid esters (including mono-, di-, and trigylcerides), or combinations thereof. For example, the free fatty acids may include free fatty acids obtained by stripping free fatty acids from a triglyceride transesterification feedstock. The biorenewable feedstock may include animal fats, animal oils, plant fats, plant oils, vegetable fats, vegetable oils, greases, or mixtures of any two or more thereof. The fatty acid esters may include fatty acid methyl ester, a fatty acid ethyl ester, a fatty acid propyl ester, a fatty acid butyl ester, or mixtures of any two or more thereof. The biorenewable feedstock may include the fatty acid distillate from vegetable oil deodorization. Depending on level of pretreatment, fats, oils, and greases, may contain between about 1 wppm and about 1,000 wppm phosphorus, and between about 1 wppm and about 500 wppm total metals (mainly sodium, potassium, magnesium, calcium, iron, and copper). Plant and/or vegetable oils and/or microbial oils include, but are not limited to, babassu oil, *carinata* oil, soybean oil, canola oil, coconut oil, rapeseed oil, tall oil, tall oil fatty acid, palm oil, palm oil fatty acid distillate, jatropha oil, palm kernel oil, sunflower oil, castor oil, camelina oil, archaeal oil, bacterial oil, fungal oil, protozoal oil, algal oil, seaweed oil, oils from halophiles, and mixtures of any two or more thereof. These may be classified as crude, degummed, and RBD (refined, bleached, and deodorized) grade, depending on level of pretreatment and residual phosphorus and metals content. However, any of these grades may be used in the present technology. Animal fats and/or oils as used above includes, but is not limited to, inedible tallow, edible tallow, technical tallow, floatation tallow, lard, poultry fat, poultry oils, fish fat, fish oils, and mixtures of any two or more thereof. Greases may include, but are not limited to, yellow grease, brown grease, waste vegetable oils, restaurant greases, trap grease from municipalities such as water treatment facilities, and spent oils from industrial packaged food operations, and mixtures of any two or more thereof. The biorenewable feedstock may include animal fats, poultry oil, soybean oil, canola oil, carinata oil, rapeseed oil, palm oil, jatropha oil, castor oil, camelina oil, seaweed oil, halophile oils, rendered fats, restaurant greases, brown grease, yellow grease, waste industrial frying oils, fish oils, tall oil, tall oil fatty acids, or mixtures of any two or more thereof. The biorenewable feedstock may include animal fats, restaurant greases, brown grease, yellow grease, waste industrial frying oils, or mixtures of any two or more thereof.

As noted in the previous paragraph, the biorenewable feedstock may be pretreated. Such pretreatments include, but are not limited to, degumming, neutralization, bleaching, deodorizing, or a combination of any two or more thereof. One type of degumming is acid degumming, which involves contacting the fat/oil with concentrated aqueous acids. Exemplary acids are phosphoric, citric, and maleic acids. This pretreatment step removes metals such as calcium and magnesium in addition to phosphorus. Neutralization is typically performed by adding a caustic (referring to any base, such as aqueous NaOH) to the acid-degummed fat/oil. The process equipment used for acid degumming and/or neutralization may include high shear mixers and disk stack centrifuges. Bleaching typically involves contacting the degummed fat/oil with adsorbent clay and filtering the spent clay through a pressure leaf filter. Use of synthetic silica instead of clay is reported to provide improved adsorption. The bleaching step removes chlorophyll and much of the residual metals and phosphorus. Any soaps that may have been formed during the caustic neutralization step (i.e., by reaction with free fatty acids) are also removed during the bleaching step. The aforementioned treatment processes are known in the art and described in the patent literature, including but not limited to U.S. Pat. Nos. 4,049,686, 4,698,185, 4,734,226, and 5,239,096.

Bleaching as used herein is a filtration process common to the processing of glyceride oils. Many types of processing configurations and filtration media such as diatomaceous earth, perlite, silica hydrogels, cellulosic media, clays, bleaching earths, carbons, bauxite, silica aluminates, natural fibers and flakes, synthetic fibers and mixtures thereof are known to those skilled in the art. Bleaching can also be referred to by other names such as clay treating which is a common industrial process for petroleum, synthetic and biological feeds and products.

Additional types of filtration may be performed to remove suspended solids from the biorenewable feedstock before and/or after and/or in lieu of degumming and/or bleaching. In some embodiments, rotoscreen filtration is used to remove solids larger than about 1 mm from the biorenewable feedstock. Rotoscreen filtration is a mechanically vibrating wire mesh screen with openings of about 1 mm or larger that continuously removes bulk solids. Other wire mesh filters of about 1 mm or larger housed in different types of filter may be also be employed, including self-cleaning and backwash filters, so long as they provide for bulk separation of solids larger than 1 mm, such as from about 1 mm to about 20 mm. In embodiments where bleaching through clay-coated pressure leaf filter is not used, cartridge or bag filters with micron ratings from about 0.1 to about 100 may be employed to ensure that only the solubilized and or finely suspended (e.g., colloidal phase) adulterants are present in the feed stream. Filtration is typically performed at temperatures high enough to ensure the feed stream is a liquid of about 0.1 to 100 cP viscosity. This generally translates into a temperature range of 20° C. to 90° C. (about 70° F. to about 195° F.

In any embodiment disclosed herein, the free fatty acids of the mixture may include fatty acids produced from hydrolysis of fatty acid esters of fat, oil, and/or grease. In any embodiment disclosed herein, the free fatty acids may include fatty acids from tall oil and/or produced from the hydrolysis of tall oil esters. In any embodiment disclosed herein, the free fatty acids may include fatty acids from palm fatty acid distillate. In any embodiment disclosed herein, the free fatty acids may include fatty acids distilled from fats, oils, and/or greases such as those containing at least about 10 wt % free fatty acids. In any embodiment disclosed herein, the free fatty acids may include fatty acids distilled from palm sludge oil and/or used cooking oil. In any embodiment disclosed herein, the free fatty acids may include oleic acid, linoleic acid, stearic acid, palmitic acid, or a combination of any two or more thereof. In any embodiment disclosed herein, the free fatty acids may include a soap form (e.g. a sodium soap and/or a potassium soaps) of the free fatty acid where, in such embodiments including a soap form, the free fatty acids have an alkalinity of at least 200 mg/kg, at least 500 mg/kg, or at least 1000 mg/kg.

As discussed previously, the renewable diesel produced in the method of the present technology includes terminal monomethyl-branched paraffins and terminal monomethyl-branched alkenes (e.g., where each terminal monomethyl-branched alkene independently includes one, two, three, or more internal carbon-carbon double bonds). Representative terminal monomethyl-branched paraffins and terminal monomethyl-branched alkenes of the present technology are illustrated below in Scheme 1.

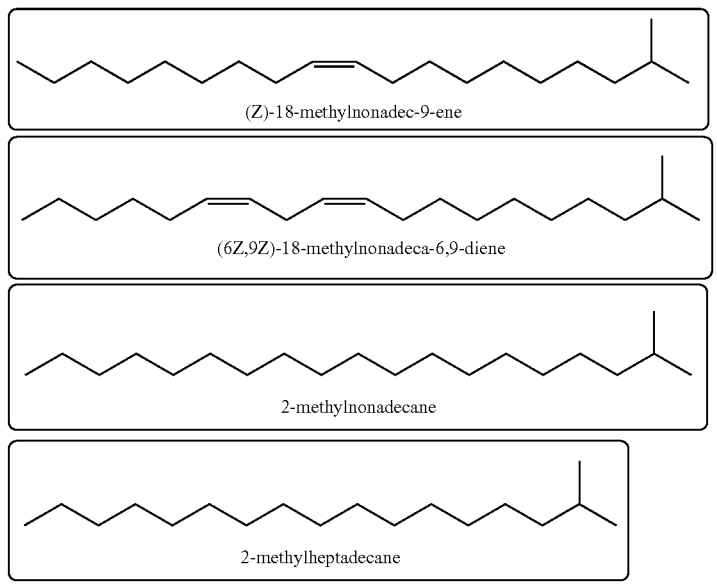

Scheme 1.

2-methylheptadecane has a cetane number of 91 according to the NREL *Compendium of Experimental Cetane Numbers*, and 2-methylheptadecane may be provided by the method of the present technology when, e.g., the mixture includes palmitic acid and isobutyric acid. In the terminal monomethyl-branched alkenes of the present technology, internal carbon-carbon double bonds are in the cis configuration—i.e., the Z confirmation per the IUPAC preferred method of describing the absolute stereochemistry of double bonds—due to their production from unsaturated free fatty acids from a biorenewable feedstock. Notably, the terminal monomethyl-branched alkenes of the present technology provide a unique hydrocarbon structure with respect to fuels. In particular, internal carbon-carbon double bonds present in petroleum-derived fuels, such as those produced from cracked stocks or partially hydrogenated cracked stocks, are essentially exclusively trans. A terminal monomethyl-branched alkene of the present technology, with its cis stereochemistry, has a lower melt point than the corresponding trans stereoisomer and therefore the present technology's terminal monomethyl-branched alkenes possess advantages for utilization as and/or inclusion in liquid fuels.

The novel renewable diesel of the present technology has a relatively low cloud point and a relatively high cetane number while also having a good balance of polarity and water immiscibility. In any embodiment disclosed herein, the renewable diesel of the present technology may have a cloud point of less than about 0° C., preferably less than about −10° C., and most preferably less than about −15° C., and the renewable diesel of the present technology may further have a cetane number of 60 or higher. Thus, in any embodiment herein, the renewable diesel may include a cloud point of about 0° C., about −2° C., about −4° C., about −6° C., about −8° C., about −10° C., about −12° C., about −14° C., about −16° C., about −18° C., about −20° C., about −22° C., about −24° C., about −26° C., about −28° C., about −30° C., about −32° C., about −34° C., about −36° C., about −38° C., about −40° C., about −42° C., about −44° C., about −46° C., about −48° C., about −50° C., about −52° C., about −54° C., about −56° C., about −58° C., about −60° C., or any range in between and/or including any two of these values or less than any one of these values. In any embodiment herein, the renewable diesel may include a freeze point less than about −40° C., especially for renewable diesel of the present technology suitable as aviation fuels; thus the renewable diesel may include a freeze point of about −40° C., about −42° C., about −44° C., about −46° C., about −48° C., about −50° C., about −52° C., about −54° C., about −56° C., about −58° C., about −60° C., about −62° C., about −64° C., about −66° C., about −68° C., about −70° C., or any range in between and/or including any two of these values or less than any one of these values.

The renewable diesel may be, in any embodiment disclosed herein, used as a drop-in fuel for diesel engines, used as a petroleum diesel blend-stock, and/or blended with biodiesel to provide a 100% renewable fuel. The renewable diesel of any embodiment herein of the present technology may be suitable as a diesel fuel, a diesel fuel additive, a diesel fuel blendstock, a turbine fuel, a turbine fuel additive, a turbine fuel blendstock, an aviation fuel, an aviation fuel additive, an aviation fuel blendstock, a fuel for portable heaters, a fuel for portable generators, or a combination of any two or more thereof. It may be that the renewable diesel is suitable for use as a diesel fuel, a diesel fuel blendstock (e.g., a winter diesel according to EN 590; an arctic diesel fuel according to EN 590), an aviation fuel blendstock, or a combination of any two or more thereof. For example, it may be the renewable diesel is suitable for use as a commercial jet fuel meeting industry standards (e.g., ASTM D1655). In any embodiment herein, the renewable diesel may include a flash point from about 100° F. (about 38° C.) to about 200° F. (about 93° C.). Thus, the flash point of the renewable diesel may be about 100° F. (about 38° C.), about 102° F. (about 39° C.), about 104° F. (about 40° C.), 106° F. (about 41° C.), about 108° F. (about 42° C.), about 110° F. (about 43° C.), about 111° F. (about 44° C.), about 113° F. (about 45° C.), about 115° F. (about 46° C.), about 117° F. (about 47° C.), about 118° F. (about 49° C.), about 122° F. (about 50° C.), about 124° F. (about 51° C.), about 126° F. (about 52° C.), about 127° F. (about 53° C.), about 129° F. (about 54° C.), about 131° F. (about 55° C.), about 133° F. (about 56° C.), about 135° F. (about 57° C.), about 136° F. (about 58° C.), about 138° F. (about 59° C.), about 140° F. (about 60° C.), about 149° F. (about 65° C.), about 158° F. (about 70° C.), about 167° F. (about 75° C.), about 176° F. (about 80° C.), about 185° F. (about 85° C.), about 194° F. (about 90° C.), about 196° F. (about 91° C.), about 198° F. (about 92° C.), about 200° F. (about 93° C.), or any range including and/or in between any two of these values. Thus, for example, in any embodiment herein the renewable diesel may include a flash point from about 100° F. (about 38° C.) to about 118° F. (about 49° C.).

The renewable diesel may have, in any embodiment disclosed herein, less than about 0.1 wt % oxygenates, and may have oxygenates in the amount of about 0.09 wt %, about 0.08 wt %, about 0.07 wt %, about 0.05 wt %, about 0.04 wt %, about 0.03 wt %, about 0.02 wt %, about 0.01 wt %, or any range including and/or in between any two of these values or below any one of these values. Such low values of oxygenates can be detected through appropriate analytical techniques, including but not limited to Instrumental Neutron Activation Analysis.

The renewable diesel of any embodiment disclosed herein may have less than about 0.1 wt % of aromatics. Thus, the renewable diesel may contain aromatics in the amount of about 0.09 wt %, about 0.08 wt %, about 0.07 wt %, about 0.06 wt %, about 0.05 wt %, about 0.04 wt %, about 0.03 wt %, about 0.02 wt %, about 0.01 wt %, about 0.009 wt %, about 0.008 wt %, about 0.007 wt %, about 0.006 wt %, about 0.005 wt %, about 0.004 wt %, about 0.003 wt %, about 0.002 wt %, about 0.001 wt %, or any range including and/or in between any two of these values or below any one of these values. In any embodiment therein, it may be that the renewable diesel includes no detectable aromatics. By "detectable" as used throughout herein is meant detection on commercially available detection instruments as of Jul. 20, 2021. The renewable diesel may contain less than about 0.01 wt % benzene, and may contain benzene in the amount of about 0.008 wt %, about 0.006 wt %, about 0.004 wt %, about 0.002 wt %, about 0.001 wt %, about 0.0008 wt %, about 0.0006 wt %, about 0.0004 wt %, about 0.0002 wt %, about 0.0001 wt %, about 0.00008 wt %, about 0.00006 wt %, about 0.00004 wt %, about 0.00002 wt %, about 0.00001 wt %, or any range including and/or in between any two of these values or below any one of these values. Such low values of benzene may be determined through appropriate analytical techniques, including but not limited to two dimensional gas chromatography of the renewable diesel. In any embodiment therein, it may be that the renewable diesel includes no detectable benzene.

The renewable diesel may have a sulfur content less than about 5 wppm. Thus, in any embodiment disclosed herein, the renewable diesel may have a sulfur content of about 4 wppm, about 3 wppm, about 2 wppm, about 1 wppm, about 0.9 wppm, about 0.8 wppm, about 0.7 wppm, about 0.6 wppm, about 0.5 wppm, about 0.4 wppm, about 0.3 wppm, about 0.2 wppm, about 0.1 wppm, or any range including and/or in between any two of these values or below any one of these values.

Optionally, if desired, the renewable diesel may be hydrogenated to provide a hydrogenated renewable diesel product of the present technology having reduced levels of unsaturation (e.g., a bromine index <100), a cetane number greater than 70, and a cloud point less than 0° C.

Isobutyric acid utilized in the present technology may be obtained from petrochemical or bio-based sources. The petrochemical pathways utilize propylene as a starting material, where propylene can be converted to isobutyric acid (i) via the Oxo process through isobutyraldehyde as an intermediate, or (ii) directly via the Koch reaction (Eq. 2).

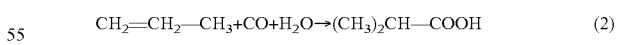

$$CH_2=CH_2-CH_3+CO+H_2O \rightarrow (CH_3)_2CH-COOH \qquad (2)$$

Bio-based pathways that produce isobutyric acid directly from sugar-based feedstocks have been disclosed. These typically rely on fungal and bacterial enzymes. As discussed below, bio-based isobutyric acid may also be derived from bio-isobutanol through an isobutyraldehyde intermediate.

Bio-isobutanol is commercially produced in fermenters. Repurposing of bio-ethanol plants to bio-isobutanol has been a stated business strategy by isobutanol producers such as Gevo and Butamax.

Isobutanol may be converted to isobutyraldehyde by two general routes: a two-step conversion route or a single step conversion.

The two-step conversion route is the more mature route in the art, and proceeds by (a) conversion of isobutanol to isobutyraldehyde, followed by (b) oxidation of isobutyraldehyde to isobutyric acid. The conversion of isobutanol to isobutyraldehyde may proceed according to a dehydrogenation reaction or an oxidation reaction as outlined respectively in Eq. 3 and Eq. 4, below:

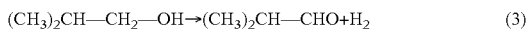

$$(CH_3)_2CH-CH_2-OH \rightarrow (CH_3)_2CH-CHO+H_2 \quad (3)$$

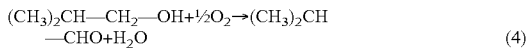

$$(CH_3)_2CH-CH_2-OH+\tfrac{1}{2}O_2 \rightarrow (CH_3)_2CH-CHO+H_2O \quad (4)$$

By way of example, the dehydrogenation reaction may be conducted over a bed of copper chromite catalyst as described in Example 1 of U.S. Pat. No. 8,742,187, where in the disclosed process the dehydrogenation catalyst requires anhydrous isobutanol as feedstock. In contrast to such anhydrous conditions, the oxidation reaction may proceed by aqueous phase partial air oxidation of butanol to butyraldehyde, a process well-known in the art (see, e.g., Ganadarias, et al., *Catal. Sci. Technol.*, 2016, 6, 4201-4209). However, one potential advantage of the dehydrogenation reaction is the production of $H_2$ along with isobutyraldehyde; should the dehydrogenation reaction be employed in producing isobutyric acid for use in the method of the present technology, the $H_2$ yielded the dehydrogenation reaction may be utilized in hydrogenation reactions such as the optional hydrogenation of the renewable diesel of the present technology discussed previously in this disclosure.

The second step in the more mature route, production of isobutyric acid from isobutyraldehyde, may proceed by air-oxidation of the isobutyraldehyde—a step in the major petrochemical route to petroleum-derived isobutyric acid. The reaction is outlined in Eq. 5 below.

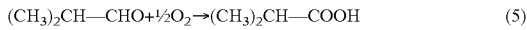

$$(CH_3)_2CH-CHO+\tfrac{1}{2}O_2 \rightarrow (CH_3)_2CH-COOH \quad (5)$$

The air oxidation reaction is typically conducted in a bubble column reactor at a temperature of about 20° C. to about 100° C. (preferably between 30° C. and 60° C.) and at pressures ranging from atmospheric to 100 psig. Air is injected into the reactor at a controlled rate with the oxygen content in the reactor tail gas closely monitored to ensure it remains well below combustion limit. The oxidation catalyst is typically a homogeneous metal acetate catalyst such as manganese acetate—however, in reviewing this commercial conversion process, the art has noted that a catalyst may not be strictly necessary. Larkin, D., *J. Org. Chem.*, 1990, 55, 1563-1568. Yet inclusion of an oxidation catalyst ensures high selectivity with minimal byproducts (CO, $CO_2$, isopropanol, acetone, propylene, and methyl formate are exemplary byproducts). Typical per pass conversions are in the 60-70% range, and the concentration of isobutyric acid in reactor effluent is in the 55-60% range.

As noted above, one-step oxidation of isobutanol to isobutyric acid is also well-known to those skilled in the art (formally the sum of Eqs 4 and 5). Oxidation reagents such as the potassium dichromate/sulfuric acid system are effective for this and may be used for lab synthesis. For commercial-scale production, one-step oxidation of butanol to butyric acid have been studied and further have shown use of a heterogeneous catalyst (gold-palladium on titanium oxide) provides for viable commercial-scale production. Gandarias et al. *ChemSusChem*, 2015, 8, 473-480.

The present technology, thus generally described, will be understood more readily by reference to the following example, which are provided by way of illustration and are not intended to be limiting of the present technology.

EXAMPLE

An exemplary method will be performed according to the protocol below, where a representative diagram of the electrolysis reactor system of the exemplary method is further provided in FIG. 1.

In the exemplary method, a holding vessel with an internal volume of about 1 liter equipped with a mechanical agitator and a heating jacket is charged with 200 mL of a mixture of isobutyric acid and oleic acid at a molar ratio of 4:1 (moles isobutyric acid: 1 mole oleic acid). The holding vessel will further be charged with 400 mL of ethanol and the resulting solution heated to 60° C. while maintaining a positive pressure to maintain the solution in liquid phase.

The solution will then be circulated through an electrolysis cell, where the solution flows between two flat plate electrodes each having an exposed surface area of about 60 $cm^2$. Connected to the electrolysis cell is a power supply which can deliver up to 100 amperes at a voltage range of 1-10 volts.

While circulating the solution through the electrolysis cell at a rate of 10-100 mL/min, the voltage and the amperage may be adjusted to achieve conversion of the solution, indicated by evolution of gas phase byproducts (mainly $CO_2$ and $H_2$) through a wet gas meter ("wet test meter" in FIG. 1). The resulting solution, now including hydrocarbon products, returns to the holding vessel as the gas phase byproducts exit the reactor system through the wet gas meter. The volumetric flow of the gas is to be measured as it is sampled for gas chromatography analysis to confirm $CO_2$ as the main component.

The holding vessel is sampled periodically for acid number analysis. The circulation through the electrolysis cell is continued until the acid number of the solution is reduced to a value less than 1 mg KOH/g. At this point, the liquid contents of the holding vessel are discharged from the holding vessel and fractionated into a gasoline cut and a diesel cut. The diesel cut will be analyzed for oxygen via neutron activation to confirm conversion of the oleic acid and isobutyric acid to hydrocarbon products (e.g. with oxygen content less than 0.1 wt %). The diesel will further be tested for cloud point and cetane numbers, where the diesel is expected to exhibit a cloud point of less than −10° C. and a cetane number greater than 60 cetane.

While certain embodiments have been illustrated and described, it should be understood that changes and modifications can be made therein in accordance with ordinary skill in the art without departing from the technology in its broader aspects as defined in the following claims. Each aspect and embodiment described above can also have included or incorporated therewith such variations or aspects as disclosed in regard to any or all of the other aspects and embodiments.

The present technology is also not to be limited in terms of the particular aspects and/or embodiments described herein, which are intended as single illustrations of individual aspects and/or embodiments of the present technology. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

The embodiments, illustratively described herein, may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. A method for producing renewable hydrocarbon fuels, the method comprising
  electrolysis of a mixture comprising (i) free fatty acids from a biorenewable feedstock, and (ii) terminal monomethyl-branched carboxylic acids, to produce an electrolysis product comprising a renewable diesel and optionally a renewable gasoline;
  wherein the renewable diesel comprises terminal monomethyl-branched paraffins and terminal monomethyl-branched alkenes.
B. The method of Paragraph A, further comprising hydrogenation of the renewable diesel.
C. The method of Paragraph A or Paragraph B, wherein the terminal monomethyl-branched carboxylic acids comprise isobutyric acid, optionally wherein the terminal monomethyl-branched carboxylic acids consist of isobutyric acid, isovaleric acid, or a mixture of isobutyric acid and isovaleric acid.
D. The method of Paragraph C, wherein the isobutyric acid is produced from isobutanol, wherein the isobutanol is from a biorenewable feedstock.
E. The method of Paragraph D, wherein the isobutyric acid is produced from isobutanol by dehydrogenating the isobutanol to produce isobutyraldehyde and $H_2$, and oxidizing the isobutyraldehyde to produce the isobutyric acid.
F. The method of Paragraph E, wherein the $H_2$ produced from dehydrogenating the isobutanol is separated from the isobutyraldehyde.
G. The method of Paragraph E or Paragraph F, wherein the $H_2$ from dehydrogenating the isobutanol is used in a hydrogenation reaction.
H. The method of any one of Paragraphs A-G, wherein the renewable gasoline comprises 2,3-dimethylbutane.
I. The method of any one of Paragraphs A-H, wherein the free fatty acids comprise fatty acids produced from hydrolysis of fatty acid esters of fat, oil, and/or grease.
J. The method of any one of Paragraphs A-I, wherein the free fatty acids comprise fatty acids from tall oil and/or produced from the hydrolysis of tall oil esters.
K. The method of any one of Paragraphs A-J, wherein the free fatty acids comprise fatty acids from palm fatty acid distillate.
L. The method of any one of Paragraphs A-K, wherein the free fatty acids comprise fatty acids distilled from fats, oils, and/or greases.
M. The method of Paragraph L, wherein the free fatty acids comprise fatty acids distilled from palm sludge oil and/or used cooking oil.
N. The method of any one of Paragraphs A-M, wherein the electrolysis is powered by renewable energy.
O A renewable diesel comprising
  terminal monomethyl-branched isoparaffins; and
  terminal monomethyl-branched alkenes where each internal carbon-carbon double bond is cis.
P. The renewable diesel of Paragraph O, wherein the renewable diesel has cloud point less than −10° C. and the cetane number greater than 60.
Q. A renewable gasoline comprising 2,3-dimethylbutane.
R. The renewable gasoline of Paragraph Q, wherein the renewable gasoline has an octane number of 87 or greater.
S. The renewable gasoline of Paragraph Q or Paragraph R, wherein the renewable gasoline is produced by a method of any one of Paragraphs A-N.
T. A method for producing renewable hydrocarbon fuels comprising
  (a) providing a free fatty acid (FFA) feed,
  (b) providing a methyl branched carboxylic acid, and
  (c) subjecting the FFA and the methyl branched carboxylic acid to Kolbe electrolysis to produce a renewable diesel and a renewable gasoline
  wherein
  the renewable diesel comprises 2-methylbranched paraffins and terminal monomethyl-branched olefins.

U. The method of Paragraph T, wherein the renewable diesel is hydrogenated.

V. The method of Paragraph T or Paragraph U, wherein the methyl branched carboxylic acid is isobutyric acid.

W. The method of Paragraph V, wherein the isobutyric acid is produced from bio-isobutanol.

X. The method of Paragraph W, wherein the bio-isobutanol is dehydrogenated to produce an isobutyraldehyde intermediate and a hydrogen coproduct.

Y. The method of Paragraph W, wherein the hydrogen is used for hydrogenation.

Z. The method of any one of Paragraphs U-Y, wherein the renewable gasoline comprises 2,3-dimethyl butane.

AA. The method of any one of Paragraphs U-Z, wherein the FFA comprises free fatty acids derived from hydrolysis of fats, oils, and greases (FOG).

AB. The method of any one of Paragraphs U-AA, wherein the FFA comprises tall oil derived from the kraft process of wood pulp manufacture.

AC. The method of any one of Paragraphs U-AB, wherein the FFA comprises palm fatty acid distillate.

AD. The method of any one of Paragraphs U-AC, wherein the FFA comprises free fatty acids obtained from distillation of FOG feedstocks characterized by high FFA content.

AE. The method of Paragraph AD, wherein the FOG feedstocks comprise palm sludge oil and used cooking oils.

AF. The method of any one of Paragraphs U-AE, wherein the Kolbe electrolysis is powered by renewable energy.

AG. A renewable diesel composition comprising terminal monomethyl-branched olefins and 2-methyl branched paraffins, wherein the linear internal olefins have a cis conformation.

AH. The renewable diesel of Paragraph AG, wherein the cloud point is less than −10° C. and the cetane number is greater than 60.

AI. A renewable hydrocarbon gasoline composition comprising 2,3-dimethylbutane.

AJ. The renewable hydrocarbon gasoline of Paragraph AI, wherein the octane number is 87 or higher.

Other embodiments are set forth in the following claims.

What is claimed is:

1. A method for producing renewable hydrocarbon fuels, the method comprising
   electrolysis of a mixture in an electrolysis cell, the electrolysis cell comprising an anode and a cathode, and the mixture comprising
   (i) free fatty acids distilled from fats, oils, and/or greases, and
   (ii) terminal monomethyl-branched carboxylic acids in at least a 100% molar excess relative to the free fatty acids, to produce an electrolysis product comprising a renewable diesel and optionally a renewable gasoline, wherein the electrolysis comprises an electrode current density of about 0.05 A/cm$^2$ to about 1.0 A/cm$^2$, and a cell voltage of about 8 Volts to about 35 Volts;
   wherein the renewable diesel comprises terminal monomethyl-branched paraffins and terminal monomethyl-branched cis alkenes; and
   wherein the renewable diesel has cloud point less than −10° C. and the cetane number greater than 60.

2. The method of claim 1, wherein the terminal monomethyl-branched carboxylic acids comprise isobutyric acid.

3. The method of claim 2, wherein the isobutyric acid is produced from isobutanol, wherein the isobutanol is from a biorenewable feedstock.

4. The method of claim 3, wherein the isobutyric acid is produced from isobutanol by
   dehydrogenating the isobutanol to produce isobutyraldehyde and H$_2$, and
   oxidizing the isobutyraldehyde to produce the isobutyric acid.

5. The method of claim 4, wherein the H$_2$ produced from dehydrogenating the isobutanol is separated from the isobutyraldehyde.

6. The method of claim 4, wherein the H$_2$ from dehydrogenating the isobutanol is used in a hydrogenation reaction.

7. The method of claim 1, wherein the renewable gasoline comprises 2,3-dimethylbutane.

8. The method of claim 1, wherein the free fatty acids distilled from fats, oils, and/or greases comprise fatty acids produced from hydrolysis of fatty acid esters of fat, oil, and/or grease.

9. The method of claim 1, wherein the free fatty acids distilled from fats, oils, and/or greases comprise fatty acids from tall oil and/or produced from the hydrolysis of tall oil esters.

10. The method of claim 1, wherein the free fatty acids distilled from fats, oils, and/or greases comprise fatty acids from palm fatty acid distillate.

11. The method of claim 1, wherein the free fatty acids distilled from fats, oils, and/or greases comprise fatty acids distilled from palm sludge oil and/or used cooking oil.

12. The method of claim 1, wherein the electrolysis is powered by renewable energy.

13. The method of claim 1, wherein the terminal monomethyl-branched alkenes comprise at least one of (Z)-18-methylnonadec-9-ene or (6Z,9Z)-18-methylnonadeca-6,9-diene.

14. The method of claim 1, wherein the electrolysis does not comprise a hydroprocessing catalyst.

15. The method of claim 1, wherein the mixture consists essentially of
   (i) free fatty acids distilled from fats, oils, and/or greases, and
   (ii) terminal monomethyl-branched carboxylic acids in at least a 100% molar excess relative to the free fatty acids.

16. The method of claim 1, wherein the mixture consists essentially of
   (i) free fatty acids distilled from fats, oils, and/or greases, where the fats, oils, and/or greases have not been hydroprocessed, and
   (ii) terminal monomethyl-branched carboxylic acids in at least a 100% molar excess relative to the free fatty acids.

17. The method of claim 1, wherein the mixture comprises at least a 300% molar excess of the terminal monomethyl-branched carboxylic acids relative to the free fatty acids.

18. The method of claim 15, wherein the mixture comprises at least a 300% molar excess of the terminal monomethyl-branched carboxylic acids relative to the free fatty acids.

19. The method of claim 16, wherein the mixture comprises at least a 300% molar excess of the terminal monomethyl-branched carboxylic acids relative to the free fatty acids.

20. The method of claim 1, wherein the electrolysis comprises an electrode current density of about 0.3 A/cm$^2$ to about 1.0 A/cm$^2$.

* * * * *